(12) United States Patent
Nishimura et al.

(10) Patent No.: US 11,935,697 B2
(45) Date of Patent: Mar. 19, 2024

(54) CAPACITOR

(71) Applicant: PANASONIC INTELLECTUAL PROPERTY MANAGEMENT CO., LTD., Osaka (JP)

(72) Inventors: Koichi Nishimura, Osaka (JP); Yukihiro Shimasaki, Hyogo (JP); Hiroki Takeoka, Nara (JP); Takafumi Okudo, Osaka (JP); Ritsuo Masaoka, Kyoto (JP); Hiromasa Ozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 17/352,821

(22) Filed: Jun. 21, 2021

(65) Prior Publication Data

US 2021/0313112 A1 Oct. 7, 2021

Related U.S. Application Data

(63) Continuation of application No. PCT/JP2019/036586, filed on Sep. 18, 2019.

(30) Foreign Application Priority Data

| Dec. 26, 2018 | (JP) | 2018-243205 |
| Dec. 26, 2018 | (JP) | 2018-243206 |
| Dec. 26, 2018 | (JP) | 2018-243207 |

(51) Int. Cl.
*H01G 2/10* (2006.01)
*H01G 2/14* (2006.01)
(Continued)

(52) U.S. Cl.
CPC ............... *H01G 2/103* (2013.01); *H01G 2/14* (2013.01); *H01G 4/248* (2013.01); *H01G 4/32* (2013.01)

(58) Field of Classification Search
CPC .......... H01G 2/103; H01G 2/14; H01G 4/248; H01G 4/32
(Continued)

(56) References Cited

U.S. PATENT DOCUMENTS 4,221,033 A * 9/1980 Kobayashi ............. H01G 4/248
29/25.42
5,034,849 A * 7/1991 Vetter ...................... H01G 4/22
361/302

(Continued)

FOREIGN PATENT DOCUMENTS

| JP | S50-128651 U | 10/1975 |
| JP | S58-097829 U | 7/1983 |

(Continued)

OTHER PUBLICATIONS

International Search Report and Written Opinion issued in International Patent Application No. PCT/JP2019/036586, dated Dec. 10, 2019; with partial English translation.

(Continued)

*Primary Examiner* — Arun Ramaswamy
(74) *Attorney, Agent, or Firm* — Rimon P.C.

(57) ABSTRACT

A capacitor includes: a capacitor element; a pair of external electrodes provided at opposite ends of the capacitor element; and a pair of metal caps and or a metal foil, the pair of metal caps each covering a corresponding one of the pair of external electrodes, the metal foil covering at least part of the capacitor element.

9 Claims, 8 Drawing Sheets

(51) Int. Cl.
*H01G 4/248* (2006.01)
*H01G 4/32* (2006.01)

(58) Field of Classification Search
USPC .............................. 361/301.4, 301.5, 306.3
See application file for complete search history.

(56) References Cited

U.S. PATENT DOCUMENTS

| | | | | |
|---|---|---|---|---|
| 2004/0022007 | A1* | 2/2004 | Erhardt | H01G 9/08 |
| | | | | 361/301.5 |
| 2006/0104006 | A1* | 5/2006 | Saito | H01G 4/224 |
| | | | | 361/301.3 |
| 2010/0302704 | A1* | 12/2010 | Ogawa | H01G 4/2325 |
| | | | | 361/306.3 |

FOREIGN PATENT DOCUMENTS

| | | | | | |
|---|---|---|---|---|---|
| JP | S58-142931 | U | | 9/1983 | |
| JP | H02-155215 | A | | 6/1990 | |
| JP | H05-182862 | A | | 7/1993 | |
| JP | 2006-093532 | A | | 4/2006 | |
| JP | 2006210681 | A | * | 8/2006 | ............ H01G 4/145 |
| JP | 2007-019235 | A | | 1/2007 | |
| JP | 2008-251595 | A | | 10/2008 | |
| JP | 2009-094122 | A | | 4/2009 | |
| JP | 2011-192788 | A | | 9/2011 | |

OTHER PUBLICATIONS

Notice of Reasons for Refusal dated Aug. 22, 2023 issued in the corresponding Japanese Patent Application No. 2020-562354, with English translation.

* cited by examiner

CAPACITOR

CROSS-REFERENCE TO RELATED APPLICATIONS

The present application is a Bypass Continuation of International Application No. PCT/JP2019/036586 filed on Sep. 18, 2019, which is based upon and claims the benefit of priority to Japanese Patent Application No. 2018-243205, filed on Dec. 26, 2018, Japanese Patent Application No. 2018-243206, filed on Dec. 26, 2018, and Japanese Patent Application No. 2018-243207, filed on Dec. 26, 2018, the entire contents of these applications are incorporated herein by reference.

TECHNICAL FIELD

The present disclosure generally relates to capacitors and more specifically, to a capacitor including a capacitor element.

BACKGROUND ART

Capacitors are passive components configured to store and release electric charges and are adopted as components of electronic devices. Capacitors may become defective due to moisture absorption, and therefore, capacitors having excellent moisture resistance are demanded. For example, JP 2008-251595 A discloses a case mold capacitor including a case made of a resin, a capacitor accommodated in the case, and an insulating mold resin filled in the case.

JP 2008-251595 A provides a film capacitor having a certain degree of moisture resistance but gives no concern for a reduction in weight.

SUMMARY

An object of the present disclosure is to provide a capacitor having a reduced weight and excellent moisture resistance.

A capacitor according to one aspect of the present disclosure includes: a capacitor element; a pair of external electrodes provided at opposite ends of the capacitor element; and a pair of metal caps and/or a metal foil, the pair of metal caps each covering a corresponding one of the pair of external electrodes, the metal foil covering at least part of the capacitor element.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

1. First Embodiment (1) Schema

Figure 1:
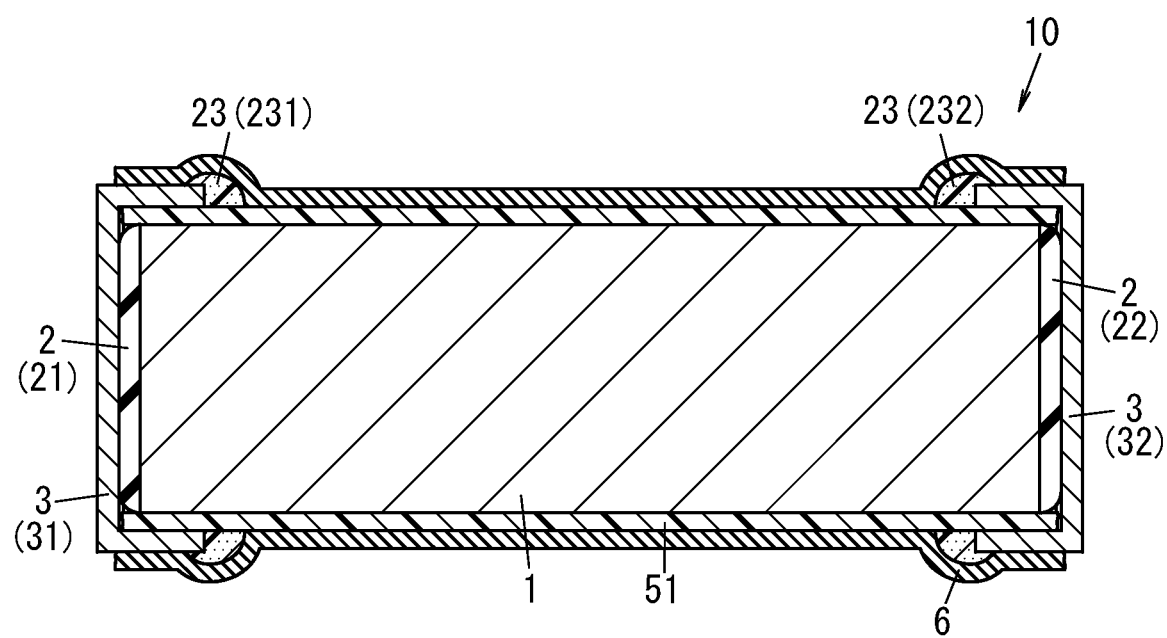
FIG. 1 is a sectional view schematically illustrating a capacitor according to a first embodiment.

As illustrated in FIG. 1, a capacitor 10 according to the present embodiment includes a capacitor element 1, a pair of external electrodes 2, and a pair of metal caps 3. The pair of external electrodes 2 are provided at opposite ends of the capacitor element 1. Each of the pair of metal caps 3 covers a corresponding one of the pair of external electrodes 2.

The capacitor 10 includes neither an exterior case nor a mold resin filled in the exterior case as described in JP 2008-251595 A. That is, the capacitor 10 adopts a so-called casing-less structure. Thus, the weight of the capacitor 10 can be reduced by at least a weight corresponding to the weight of a conventional exterior case.

As described above, the capacitor 10 includes the metal caps 3 covering the external electrodes 2. The metal caps 3 have a lower permeability to gas such as water vapor than the external electrodes 2. Thus, covering the external electrodes 2 with the metal caps 3 to avoid direct contact of the external electrodes 2 with external air easily suppresses moisture from being absorbed by the external electrode 2. The capacitor 10 according to the present embodiment includes the metal caps 3 as described above and can thus have excellent moisture resistance.

(2) Details

The capacitor 10 according to the present embodiment will be described in detail below with reference to FIGS. 1 to 2B.

Figure 2A:
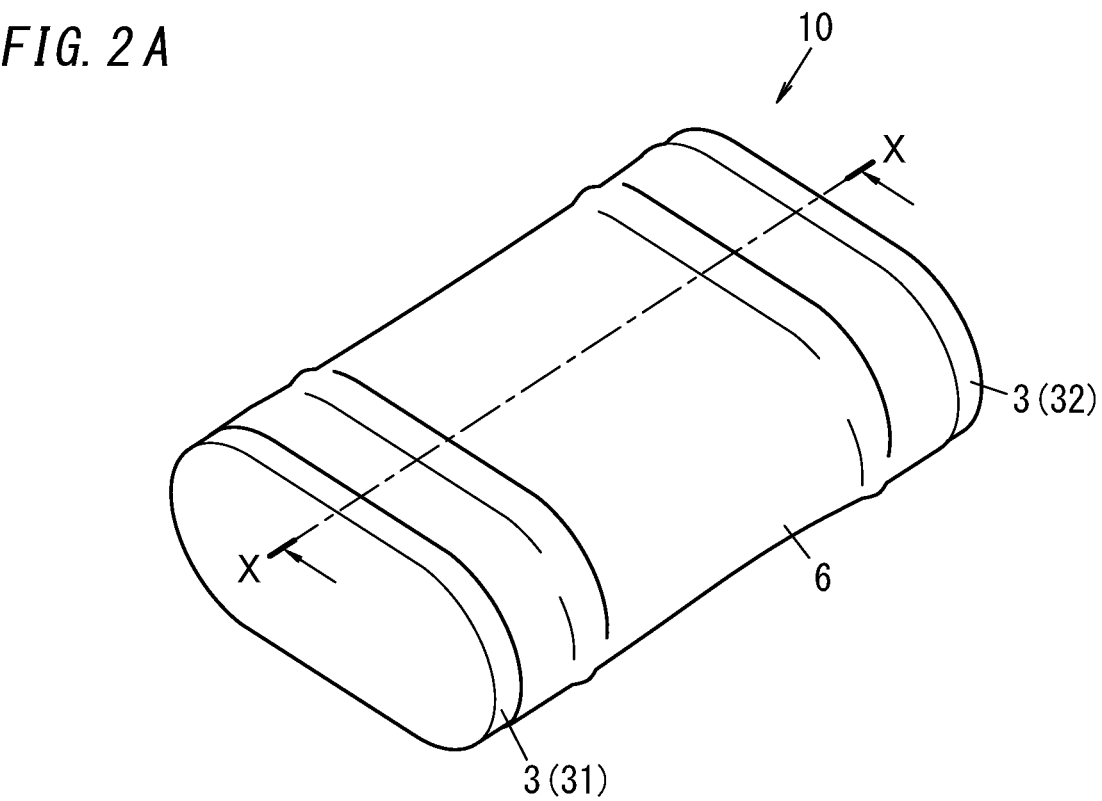
FIG. 2A is a perspective view illustrating the capacitor of the first embodiment, where the capacitor is provided with a heat shrinkage tube.

FIG. 2A is a perspective view illustrating the capacitor 10 according to the present embodiment. FIG. 1 is a sectional view along line X-X of FIG. 2A. FIG. 2B is a perspective view illustrating the capacitor 10 provided without a heat shrinkage tube 6.

The capacitor 10 according to the present embodiment adopts a so-called casing-less structure and includes no exterior case as described in JP 2008-251595 A. That is, the capacitor 10 is a casing-less capacitor. As illustrated in FIG. 1, The capacitor 10 includes the capacitor element 1, the pair of external electrodes 2, and the pair of metal caps 3. The capacitor 10 preferably further includes a capacitor element protecting member 51. The capacitor 10 preferably further includes an edge sealing member 23. The capacitor 10 preferably further includes the heat shrinkage tube 6. Each component will be described below. Note that in the present specification, "A and/or B" means "A", "B", or "A and B".

<Capacitor Element>

First of all, the capacitor element 1 (a capacitor body) will be described. The capacitor element 1 includes a plastic film as a dielectric. Examples of the capacitor element 1 include a wound capacitor element 7 (see FIG. 7B) and a stacked capacitor element 8 (see FIG. 8D). The wound capacitor element 7 and the stacked capacitor element 8 will be described below.

<<Wound Capacitor Element>>

The wound capacitor element 7 may be manufactured by, for example, the following method. First of all, a metallized film is prepared. Specifically, the metallized film includes a first metallized film 71 and a second metallized film 72 (see FIG. 7A).

The metallized film includes a dielectric film and a conductive layer.

Specifically, the first metallized film 71 includes a first dielectric film 701 and a first conductive layer 711. The first dielectric film 701 is an elongated film. The first conductive layer 711 is provided on one surface, except for a first margin part 721, of the first dielectric film 701. The first margin part 721 is a part where the first dielectric film 701 is exposed. The first margin part 721 has a band-like shape along a long side of the first dielectric film 701 and is narrower than the first conductive layer 711.

The second metallized film 72 has the same configuration as the first metallized film 71. That is, the second metallized film 72 includes a second dielectric film 702 and a second conductive layer 712. The second dielectric film 702 is an elongated film having the same width as the first dielectric film 701. The second conductive layer 712 is provided on one surface, except for a second margin part 722, of the second dielectric film 702. The second margin part 722 is a part where the second dielectric film 702 is exposed. The second margin part 722 has a band-like shape along a long side of the second dielectric film 702 and is narrower than the second conductive layer 712.

The first dielectric film 701 and the second dielectric film 702 are made of, for example, polypropylene, polyethylene terephthalate, polyethylene naphthalate, polyphenylene sulfide, or polystyrene. The first conductive layer 711 and the second conductive layer 712 are formed by a method such as vapor deposition or sputtering. The first conductive layer 711 and the second conductive layer 712 are made of, for example, aluminum, zinc, and magnesium.

Figure 7A:
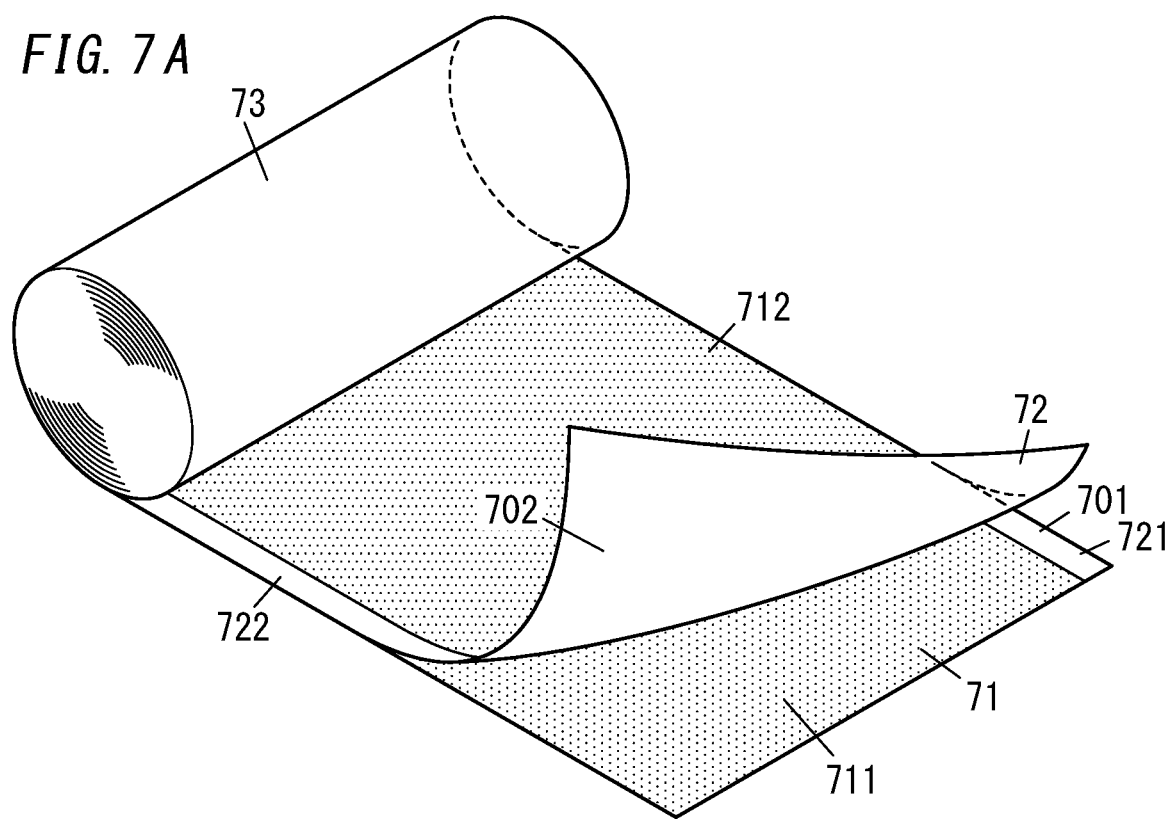
FIG. 7A is a view (perspective view) illustrating a step of a method for manufacturing a wound capacitor element.

Then, as illustrated in FIG. 7A, the first metallized film 71 and the second metallized film 72 are stacked on each other such that two long sides of the first metallized film 71 are aligned with two long sides of the second metallized film 72. At this time, the first dielectric film 701 or the second dielectric film 702 is between the first conductive layer 711 and the second conductive layer 712. In addition, the long side along which the first margin part 721 is provided is on an opposite side to the long side along which the second margin part 722 is provided. The first metallized film 71 and the second metallized film 72 stacked on each other as described above are rolled up to obtain a winding body 73 in the shape of a column. Thereafter, the winding body 73 is pressed from both sides thereof to be processed into a flat winding body 74 (see FIG. 7B). The flat winding body 74 has an oval cross section shape. Flattening as described above saves space.

The wound capacitor element 7 is thus obtained. In the wound capacitor element 7, the first conductive layer 711 serves as a first interior electrode, and the second conductive layer 712 serves as a second interior electrode. The interior electrodes in a pair face each other with the dielectric film (the first dielectric film 701 or the second dielectric film 702) provided therebetween.

<<Stacked Capacitor Element>>

In contrast, the stacked capacitor element 8 may be manufactured by, for example, the following method. First of all, a metallized film is prepared. Specifically, the metallized film includes first metallized films 81 and second metallized films 82 (see FIG. 8A).

Each metallized film includes a dielectric film and a conductive layer.

Specifically, each first metallized film 81 includes a first dielectric film 801 and a first conductive layer 811. The first dielectric film 801 is a rectangular film. The first conductive layer 811 is provided on one surface, except for a first margin part 821, of the first dielectric film 801. The first margin part 821 is a part where the first dielectric film 801 is exposed. The first margin part 821 has a band-like shape along a side of the first dielectric film 801 and is narrower than the first conductive layer 811.

Each second metallized film 82 has the same configuration as the first metallized film 81. That is, each second metallized film 82 includes a second dielectric film 802 and a second conductive layer 812. The second dielectric film 802 is a rectangular film having the same size as the first dielectric film 801. The second conductive layer 812 is provided on a surface, except for a second margin part 822, of the second dielectric film 802. The second margin part 822 is a part where the second dielectric film 802 is exposed. The second margin part 822 has a band-like shape along a side of the second dielectric film 802 and is narrower than the second conductive layer 812.

The first dielectric film 801 and the second dielectric film 802 are made of, for example, polypropylene, polyethylene terephthalate, polyethylene naphthalate, polyphenylene sulfide, or polystyrene. The first conductive layer 811 and the second conductive layer 812 are formed by a method such as vapor deposition or sputtering. The first conductive layer 811 and the second conductive layer 812 are made of, for example, aluminum, zinc, and magnesium.

Figure 8A:
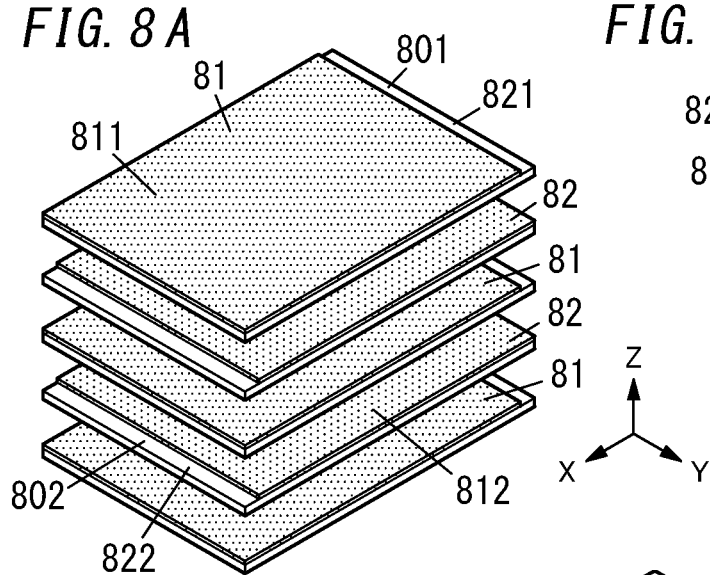
FIG. 8A is a view (perspective view) illustrating a step of a method for manufacturing a stacked capacitor element.
Figure 8B:
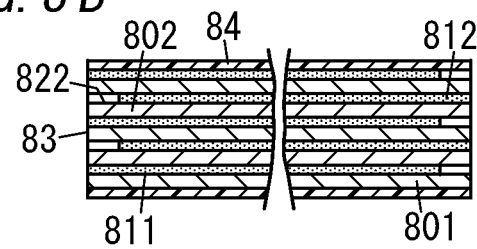
FIG. 8B is a view (sectional view) illustrating a step of the method for manufacturing the stacked capacitor element.
Figure 8C:
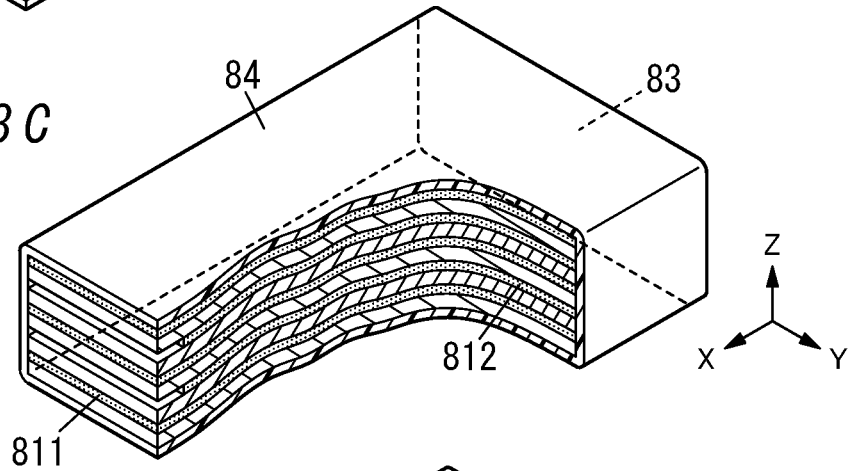
FIG. 8C is a partially cutaway perspective view illustrating the stacked capacitor element of FIG. 8B.

Next, as illustrated in FIGS. 8A and 8B, the first metallized films 81 and the second metallized films 82 are alternately stacked with their four sides are aligned to one other. At this time, the first dielectric film 801 or the second dielectric film 802 is between each first conductive layer 811 and each second conductive layer 812. In addition, the side on which the first margin part 821 is provided is on an opposite side to the side on which the second margin part 822 is provided. In FIG. 8A, the first margin part 821 is disposed at the back (in the negative direction of an X-axis), and the second margin part 822 is disposed at the front (in the positive direction of the X-axis). Thus, the plurality of first metallized films 81 and the plurality of second metallized films 82 are stacked so that they are formed into one piece, thereby obtaining a layered body 83 as shown in FIGS. 8B and 8C. In addition, the layered body 83 is covered with a protection film 84 except for a front surface (a surface facing in the positive direction of the X-axis) and the rear surface (a surface facing in the negative direction of the X-axis) of the layered body 83. The protection film 84 is an electrically insulating film.

The stacked capacitor element 8 is thus obtained. In the stacked capacitor element 8, each first conductive layer 811 serves as a first interior electrode, and each second conductive layer 812 serves as a second interior electrode. The interior electrodes in each pair face each other with the dielectric film (the first dielectric film 801 or the second dielectric film 802) provided therebetween.

<External Electrode>

Next, the external electrode 2 will be described. As illustrated in FIG. 1, the pair of external electrodes 2 are a first external electrode 21 and a second external electrode 22. The pair of external electrodes 2 are provided at opposite ends of the capacitor element 1. Each of the pair of external electrodes 2 is electrically connected to a corresponding one of the pair of interior electrodes of the capacitor element 1. The external electrodes 2 may be formed by, for example, metallikon (thermal spraying, metal splaying). The material for the external electrodes 2 is not particularly limited, and examples of the material include zinc. The external electrodes 2 may consist of zinc or may include a mixture of zinc and other metals such as tin. In addition, the material for the external electrode 2 is preferably a material having a low melting point. In this case, when the external electrodes 2 are formed by metallikon, the capacitor element 1 is less likely to become defective. The material for the external electrodes 2 preferably has a melting point of, for example, 700° C. or lower and more preferably has a melting point of 450° C. or lower.

Figure 7B:
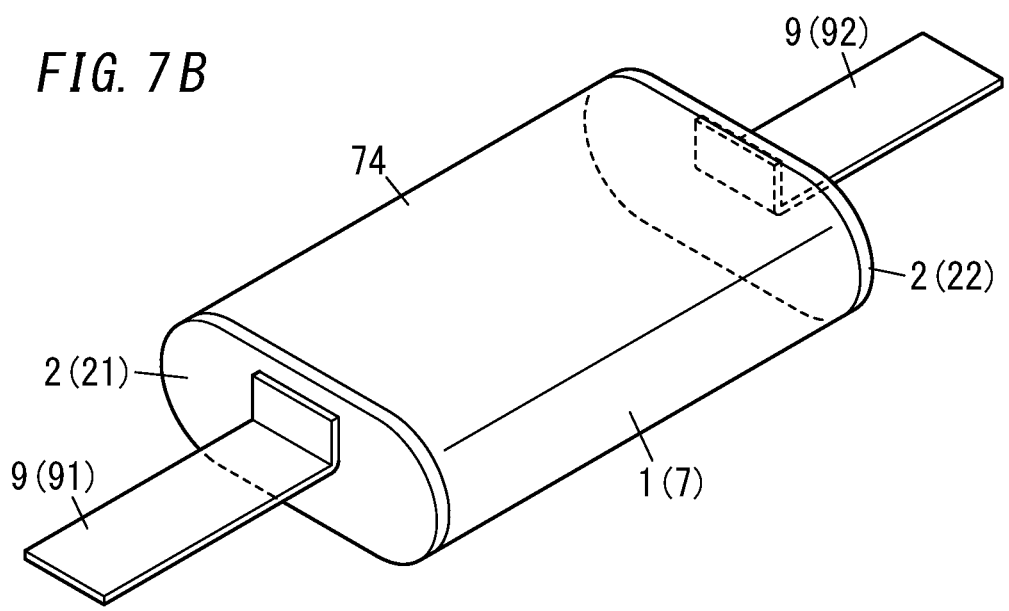
FIG. 7B is a perspective view illustrating the wound capacitor element.

In the case of the wound capacitor element 7, as illustrated in FIG. 7B, the external electrodes 2 (the first external electrode 21 and the second external electrode 22) are formed by metallikon on opposite end surfaces of the flat winding body 74. The first external electrode 21 is electrically connected to the first conductive layer 711 (the first interior electrode). The second external electrode 22 is electrically connected to the second conductive layer 712 (the second interior electrode). The first conductive layer 711 and the second conductive layer 712 constitute the pair of interior electrodes.

In the first embodiment, no bus bars 9 are directly connected to the external electrodes 2 (see FIG. 1), but the bus bars 9 may be electrically connected to the external electrodes 2 as necessary. For example, as illustrated in FIG. 7B, a first bus bar 91 is electrically connected to the first external electrode 21, and a second bus bar 92 is electrically connected to the second external electrode 22. Examples of a method for connection of the bus bars include solder welding, resistance welding, and ultrasonic welding. The first bus bar 91 and the second bus bar 92 are made of, for example, copper or a copper alloy and have a plate shape.

Figure 8D:
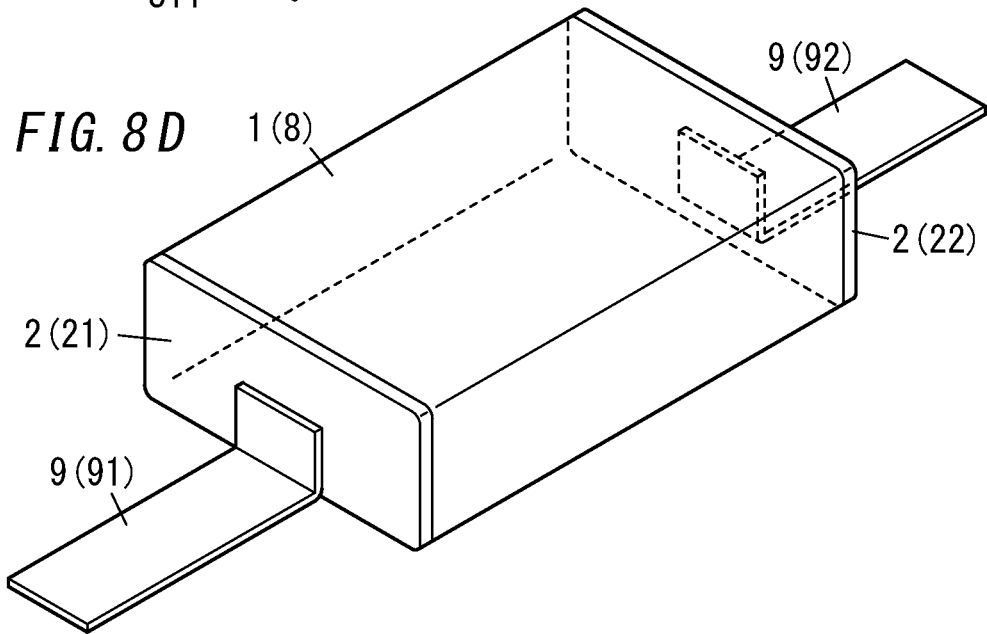
FIG. 8D is a perspective view illustrating the stacked capacitor element.

In contrast, in the case of the stacked capacitor element 8, as illustrated in FIG. 8D, the external electrodes 2 (the first external electrode 21 and the second external electrode 22) are formed by metallikon on the front surface and the rear surface of the layered body 83. The first external electrode 21 is electrically connected to the first conductive layers 811 (the first interior electrodes). The second external electrode 22 is electrically connected to the second conductive layers 812 (the second interior electrodes). The first conductive layer 811 and the second conductive layer 812 constitute one pair of interior electrodes.

Thereafter, the bus bars 9 may be electrically connected to the external electrodes 2 as necessary. For example, as illustrated in FIG. 8D, the first bus bar 91 is electrically connected to the first external electrode 21, and the second bus bar 92 is electrically connected to the second external electrode 22. Examples of a method for connection of the bus bars include solder welding, resistance welding, and ultrasonic welding. The first bus bar 91 and the second bus bar 92 are made of, for example, copper or a copper alloy and have a plate shape.

Figure 2B:
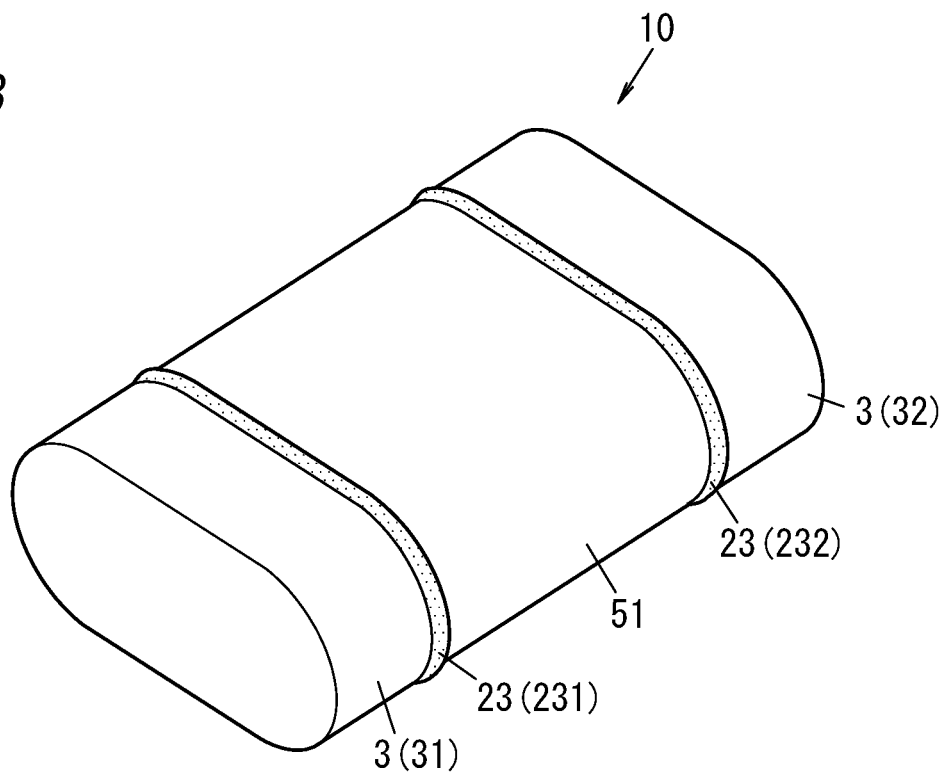
FIG. 2B is a perspective view illustrating the capacitor of the first embodiment, where the capacitor is not provided with the heat shrinkage tube.

As illustrated in FIGS. 1 to 2B, the capacitor 10 according to the present embodiment adopts the wound capacitor element 7 as the capacitor element 1. As described above, the capacitor 10 according to the present embodiment includes no bus bars 9 connected to the external electrodes 2 of the wound capacitor element 7.

<Metal Cap>

Next, the metal caps 3 will be described. The metal caps 3 are caps made of metal and having a bottomed tubular shape. The metal caps 3 have openings substantially the same shape as both ends of the capacitor element 1. Since the capacitor element 1 of the present embodiment is the wound capacitor element 7, the opening of each metal cap 3 has an oval shape. In the case of the capacitor element 1 being the stacked capacitor element 8, the opening of each metal cap 3 has a rectangular shape.

The pair of metal caps 3 are a first metal cap 31 and a second metal cap 32. The pair of metal caps 3 cover both the ends of the capacitor element 1. Thus, each of the pair of metal caps 3 covers a corresponding one of the pair of external electrodes 2. That is, the first metal cap 31 covers the first external electrode 21, and the second metal cap 32 covers the second external electrode 22. Each metal cap 3 has an inner bottom surface electrically connected to the corresponding one of the external electrodes 2. Each metal cap 3 has an opening edge, and the opening edge is located at the outer peripheral surface of the capacitor element 1.

The material for the metal caps 3 is not particularly limited. The material for the metal caps 3 is at least a material less permeable to moisture and gas such as water vapor than the external electrode 2. From this point of view, the material for the metal caps 3 includes, for example, copper.

In this embodiment, when the external electrodes 2 are formed by metallikon, the external electrodes 2 may have an uneven thickness. Moreover, both end surfaces (surfaces on which the external electrodes 2 are to be formed) of the capacitor element 1 include a plurality of cross sections of the first metallized film 71 and the second metallized film 72 and may thus be uneven. Therefore, the surfaces of the external electrodes 2 may have micro gaps and thin parts of the layers of the external electrodes 2. When moisture and gas such as water vapor enter via such parts, the capacitor 10 may become defective or the service life of the capacitor 10 may be reduced. However, in the present embodiment, the metal caps 3 cover the external electrodes 2 so that the external electrodes 2 are not directly in contact with external air, and therefore, the entry of moisture and gas such as water vapor can be suppressed, thereby improving the moisture resistance of the capacitor 10.

The metal caps 3 preferably cover interfaces between the capacitor element 1 and each of the pair of external electrodes 2. As described above, the external electrodes 2 are formed by metallikon on the opposite end surfaces of the capacitor element 1. The interfaces between the capacitor element 1 and each of the external electrodes 2 may have micro gaps via which moisture and gas such as water vapor may enter the capacitor element 1. However, when the interfaces are covered with the metal caps 3, the moisture resistance of the capacitor 10 can be further improved. Note that in FIG. 1, the metal caps 3 cover the interfaces between the capacitor element 1 and each of the external electrodes 2 via the capacitor element protecting member 51 which will be described later.

The metal caps 3 are attached to the capacitor element 1 by, for example, the following method. First of all, the metal caps 3 are prepared which have a shape similar to the shape of the ends of the capacitor element 1 which are provided with the external electrodes 2. Note that in FIG. 1, the capacitor element 1 is covered with the capacitor element protecting member 51 which will be described later, and then, the metal caps 3 are attached, and therefore, metal caps 3 each having a size which fits to the shape of the end of the capacitor element 1 covered with the capacitor element protecting member 51 are adopted. In the case of the wound capacitor element 7 as illustrated in FIGS. 2A and 2B being adopted, the metal caps 3 each have an oval cylinder shape with one bottom surface being open. The shape of each metal cap 3 is not limited to the oval cylinder shape but may have a shape attachable to the end of the capacitor element 1 to cover the corresponding one of the external electrodes 2. For example, in the case of adopting the stacked capacitor element 8, each metal cap 3 may be in the shape of a rectangular parallelepiped with one surface being open.

The metal cap 3 may be connected to the external electrode 2 of the capacitor element 1 by the following method. For example, the metal cap 3 is put on a hot plate. At this time, the hot plate is in contact with a bottom surface of the metal cap 3. On the inner bottom surface of the metal cap 3, a solder ball is disposed, and then, the end of the capacitor element 1 which is provided with the external electrode 2 is inserted in the metal cap 3. Heat of the hot plate melts the solder ball, thereby bonding the external electrode 2 and the metal cap 3 via the melted solder ball. The capacitor 10 including the metal caps 3 can thus be obtained. Since the external electrodes 2 are in contact with the metal caps 3, the external electrodes 2 are also electrically connected to the metal caps 3.

<Capacitor Element Protecting Member>

As illustrated in FIG. 1, the capacitor 10 preferably further includes the capacitor element protecting member 51. The capacitor element protecting member 51 is a member that covers at least part of the capacitor element 1 to protect the at least part of the capacitor element 1. The capacitor element protecting member 51 preferably covers the entirety of a side surface of the capacitor element 1. The side surface is a surface of the capacitor element 1 except for both the end surfaces. On the opposite end surfaces, the external electrodes 2 are located. In the present embodiment, the capacitor 10 includes the metal caps 3, and therefore, moisture can be suppressed from being absorbed by the external electrode 2. In addition, covering the entirety of the side surface of the capacitor element 1 with the capacitor element protecting member 51 so that the capacitor element 1 is not in direct contact with external air easily suppresses moisture from being absorbed by the surface of the capacitor element 1. As described above, the capacitor 10 further includes the capacitor element protecting member 51, and therefore, the moisture resistance of the capacitor 10 can be further improved.

The material for the capacitor element protecting member 51 is not particularly limited. The material for the capacitor element protecting member 51 is at least an electrically insulating material. The material for the capacitor element protecting member 51 is preferably a material which is less permeable to moisture and gas such as water vapor than the surface of the capacitor element 1. In this case, the moisture resistance of the capacitor 10 can further be improved.

The capacitor element protecting member 51 preferably includes at least one selected from the group consisting of an insulating film, a gas barrier film, and a prepreg hardened material. In this case, moisture is more easily suppressed from being absorbed by the surface of the capacitor element 1, so that the moisture resistance of the capacitor 10 can further be improved.

The insulating film is not particularly limited. The insulating film is at least an electrically insulating film. Examples of the material for the insulating film include, for example, polypropylene, polyethylene, and polyimide.

The gas barrier film is not particularly limited. The gas barrier film is at least a film which is electrically insulating and which is less permeable to gas such as water vapor. The gas barrier film may be a film including a base material film and a gas barrier layer formed on the base material film. The base material film is not particularly limited. Examples of the base material film include a polyethylene terephthalate (PET) film (melting point 265° C., glass transition point 80° C. (TMA method)), a polyphenylene sulfide (PPS) film (melting point 280° C., glass transition point 100° C.), a polyether sulfone (PES) film (glass transition point 220° C.), a polyetherimide (PEI) film (glass transition point 220° C.), and a polyether ether ketone (PEEK) film (melting point 340° C., glass transition point 140° C.). These films also have excellent heat resistance, and therefore, the heat resistance of the capacitor 10 can also be improved. Note that the melting points and the glass transition points described above are data based on a DSC method (temperature increase rate: 10° C./min). The gas barrier layer is not particularly limited. The gas barrier layer includes, for example, at least one of silicon oxide or aluminum oxide. The gas barrier layer may be formed by, for example, vapor deposition, sputtering, or a plasma CVD method.

The prepreg hardened material is a substance which is completely cured prepreg and which is in the state of C-stage. The C-stage refers to an insoluble and infusible state and is the final stage in the curing reaction. The prepreg includes a reinforcement member and a thermosetting resin composition.

The reinforcement member is not particularly limited, and examples of the reinforcement member include woven cloth or unwoven cloth made of organic fiber or inorganic fiber. Examples of the reinforcement member include glass cloth and unwoven cloth made of PET fiber.

The thermosetting resin composition is not particularly limited, and examples of the thermosetting resin composition include a composition containing a thermosetting resin in liquid form at an ordinary temperature (25° C.) before the curing reaction. The thermosetting resin is not particularly limited, and examples of the thermosetting resin include an epoxy resin, an unsaturated polyester resin, and a polyimide resin. Among these examples, the epoxy resin is preferable. The epoxy resin is excellent in heat resistance, chemical resistance, resilience, electrical insulation property, adhesive property, and other properties. The curing temperature of the thermosetting resin composition is preferably 120° C. or lower. In this case, it is possible to reduce the influence of heat over the capacitor element 1 when the thermosetting resin composition. Thermosetting resin composition may contain an inorganic filler. The inorganic filler is not particularly limited, and examples of the inorganic filler include silica, alumina, silicon nitride, boron nitride, magnesia, boehmite, carbonic acid calcium, aluminum hydroxide, and talc. Moreover, the thermosetting resin composition may contain a publicly known hardener, a publicly known catalyst, and the like as necessary.

As illustrated in FIG. 1, the capacitor element protecting member 51 preferably covers the interfaces between the capacitor element 1 and each of the pair of external electrodes 2. That is, the capacitor element protecting member 51 has ends which preferably extend outward beyond the interfaces between the capacitor element 1 and each of the pair of external electrodes 2. As described above, the pair of external electrodes 2 are formed by metallikon on the opposite ends of the capacitor element 1. The interfaces between the capacitor element 1 and each of the pair of external electrodes 2 may have micro gaps via which moisture and gas such as water vapor may enter the capacitor element 1. However, when the interfaces are covered with the capacitor element protecting member 51, the moisture resistance of the capacitor 10 can be further improved. In FIG. 1, the capacitor element protecting member 51 covers interfaces between the capacitor element 1 and each of the pair of external electrodes 2, and the pair of metal caps 3 covers the interfaces via the capacitor element protecting member 51. This can further suppress moisture and gas such as water vapor from entering via the gaps at the interfaces.

<Edge Sealing Member>

As illustrated in FIG. 1, the capacitor 10 preferably further includes the edge sealing members 23. The edge sealing members 23 seal the opening edges of the metal caps 3. That is, the edge sealing members 23 seal the interfaces between the capacitor element 1 and each of the opening edges of the metal caps 3. The edge sealing members 23 include a first edge sealing member 231 and a second edge sealing member 232. The first edge sealing member 231 seals the interface between the opening edge of the first metal cap 31 and the capacitor element 1, and the second edge sealing member 232 seals the interface between the opening edge of the second metal cap 32 and the capacitor element 1.

In an aspect in which the metal caps 3 are attached after the capacitor element 1 is covered with the capacitor element protecting member 51, the edge sealing members 23 seal, as illustrated in FIG. 1, the interfaces between the capacitor element protecting member 51 and each of the opening edges of the metal caps 3. That is, in FIG. 1, the edge sealing members 23 seal the interfaces between the capacitor element 1 and each of the opening edges of the metal caps 3 via the capacitor element protecting member 51. As described above, in the case of covering the capacitor element 1 with the capacitor element protecting member 51 after the metal caps 3 are attached to the capacitor element 1, it is at least required that after the metal caps 3 is attached and the interfaces between the capacitor element 1 and each of the opening edges of the metal caps 3 are sealed with the edge sealing members 23, the capacitor element 1 is covered with the capacitor element protecting member 51. Thus, sealing the opening edges of the metal caps 3 with the edge sealing members 23 can further suppress moisture and gas such as water vapor from entering via the gaps formed in the interfaces between the capacitor element 1 and each of the opening edges of the metal caps 3 or the interfaces between the capacitor element protecting member 51 and each of the opening edges of the metal caps 3.

The material for the edge sealing members 23 is not particularly limited, and examples of the material include a material that can seal the opening edges of the metal caps 3. The material for the edge sealing members 23 is preferably a material less permeable to moisture and gas such as water vapor. Examples of the material for the edge sealing member 23 include: a resin such as an epoxy resin; and an adhesive. As the edge sealing members 23, a denatured olefin-based hot-melt adhesive and a tape provided with the adhesive may be used. When the thermosetting resin is adopted as the edge sealing members 23, the melting point of the thermosetting resin is preferably 110° C. or lower. In this case, it is possible to reduce the influence of heat over the capacitor element 1 when the edge sealing members 23 are formed.

<Heat Shrinkage Tube>

As illustrated in FIGS. 1 and 2A, the capacitor 10 preferably further includes the heat shrinkage tube 6. The heat shrinkage tube 6 covers at least part of the capacitor element 1. The heat shrinkage tube 6 preferably covers the entirety of the side surface of the capacitor element 1. The heat shrinkage tube 6 is a resin member having a tube shape and has a property of shrinking when heated. For example, the heat shrinkage tube 6 is cut in substantially the same length as the capacitor 10, and the heat shrinkage tube 6 thus cut is fit in the capacitor 10 and is heated, and thereby the heat shrinkage tube 6 shrinks, which enables the heat shrinkage tube 6 to closely adhere to the capacitor 10. The material, thickness, and size of the heat shrinkage tube 6 are not particularly limited. As the heat shrinkage tube 6, any tube may be used in accordance with the size of the capacitor 10. The capacitor 10 further includes the heat shrinkage tube 6, and therefore, moisture and gas such as water vapor can further be suppressed from entering the capacitor element 1, so that the capacitor 10 can have more excellent moisture resistance. Note that as illustrated in FIG. 1, the heat shrinkage tube 6 is preferably attached as an outermost layer of the capacitor 10.

In the present embodiment, as illustrated in FIGS. 1 and 2A, the heat shrinkage tube 6 is provided as the outermost layer of the capacitor 10. However, as described above, the capacitor 10 does not have to include the heat shrinkage tube 6. That is, the capacitor 10 does not have to include the heat shrinkage tube 6 as illustrated in FIG. 2B. In FIG. 2B, the capacitor 10 includes the capacitor element protecting member 51 covering the entirety of the side surface of the capacitor element 1, the pair of metal caps 3 each covering a corresponding one of the external electrodes 2, and the edge sealing members 23 covering and sealing the interfaces between the capacitor element protecting member 51 and each of the opening edges of the pair of metal caps 3.

2. Second Embodiment (1) Schema

In a second embodiment, components similar to those of the first embodiment are denoted by the same reference signs as those in the first embodiment, and the detailed description thereof may be omitted.

Figure 3:
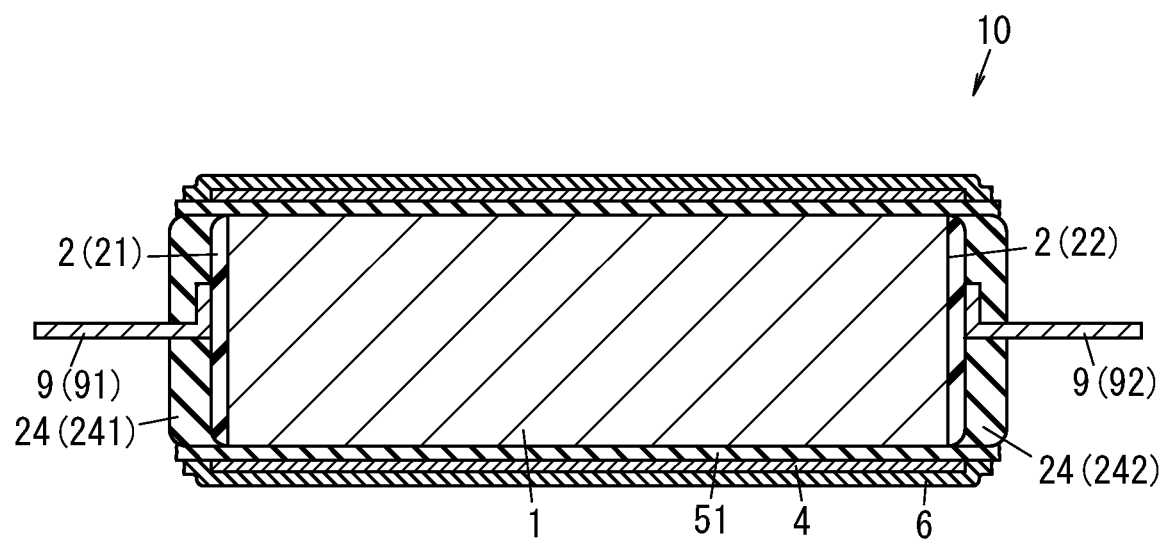
FIG. 3 is a sectional view schematically illustrating a capacitor according to a second embodiment.

As illustrated in FIG. 3, a capacitor 10 according to the present embodiment includes a capacitor element 1, a pair of external electrodes 2, and a metal foil 4. The pair of external electrodes 2 are provided at opposite ends of the capacitor element 1. The metal foil 4 covers at least part of the capacitor element 1.

The capacitor 10 includes neither an exterior case nor a mold resin filled in the exterior case as described in JP 2008-251595 A. That is, the capacitor 10 adopts a so-called casing-less structure. Thus, the weight of the capacitor 10 can be reduced by at least a weight corresponding to the weight of a conventional exterior case.

As described above, the capacitor 10 includes the metal foil 4 covering at least part of the capacitor element 1. The metal foil 4 is less permeable to gas such as water vapor than the surface of the capacitor element 1. Thus, at least part of the surface of the capacitor element 1 is covered with the metal foil 4 so that the at least part of the surface of the capacitor element 1 is not in direct contact with external air, and thereby, moisture is easily suppressed from being absorbed by the surface of the capacitor element 1. The capacitor 10 according to the present embodiment includes the metal foil 4 as described above and can thus have excellent moisture resistance.

(2) Details

Figure 4A:
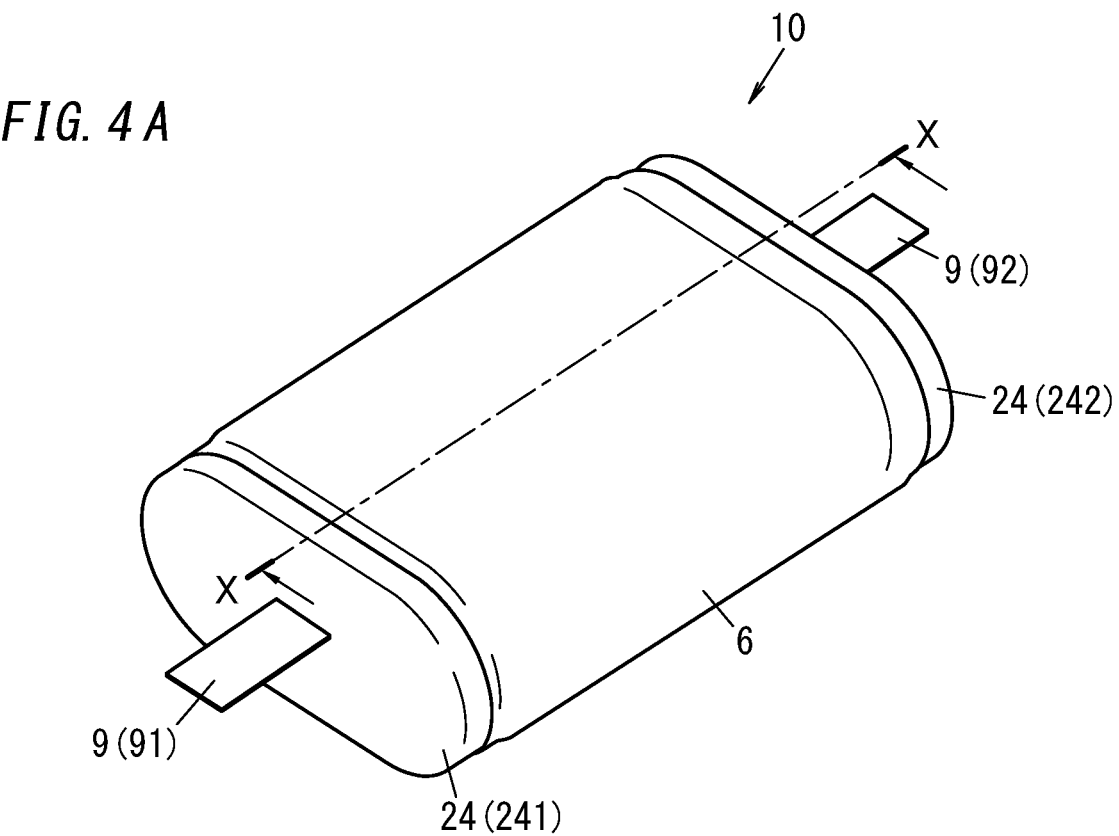
FIG. 4A is a perspective view illustrating the capacitor of the second embodiment, where the capacitor is provided with a heat shrinkage tube.
Figure 4B:
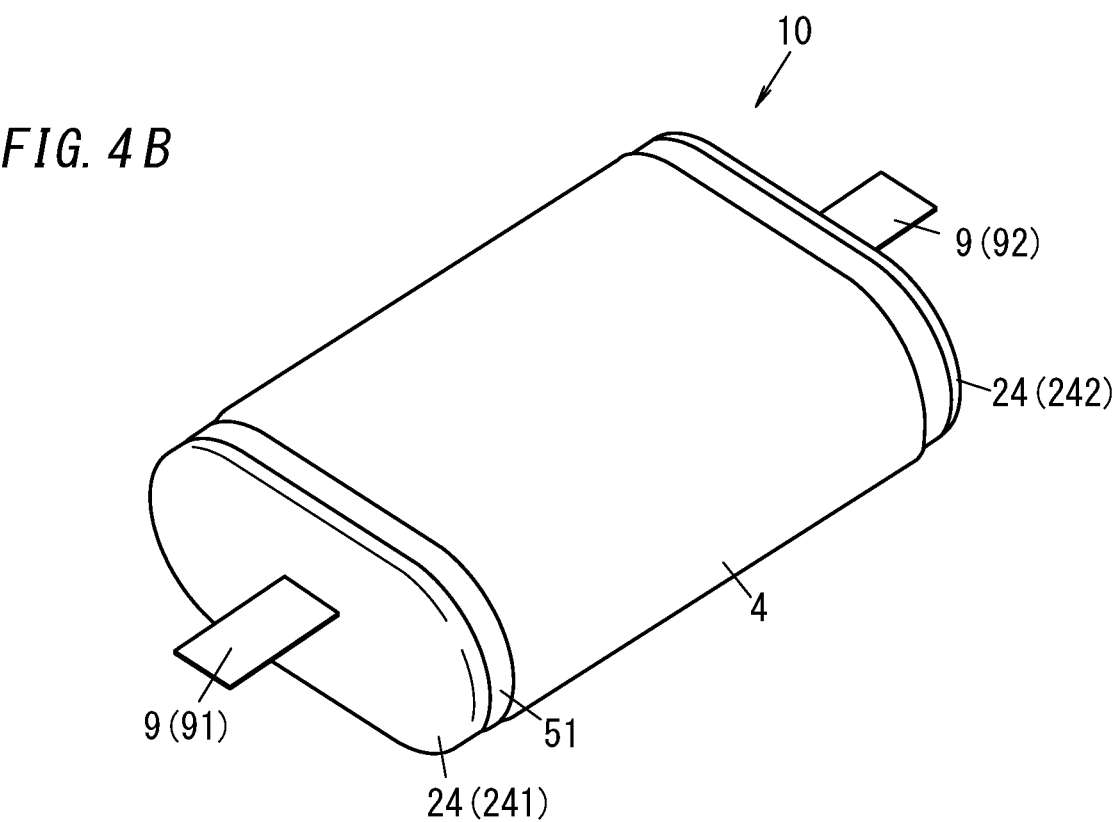
FIG. 4B is a perspective view illustrating the capacitor of the second embodiment, where the capacitor is not provided with the heat shrinkage tube.

The capacitor 10 according to the present embodiment will be described in detail below with reference to FIGS. 3 to 4B. FIG. 4A is a perspective view illustrating the capacitor 10 according to the present embodiment. FIG. 3 is a sectional view along line X-X of FIG. 4A. FIG. 4B is a perspective view illustrating the capacitor 10 provided without a heat shrinkage tube 6.

The capacitor 10 according to the present embodiment adopts a so-called casing-less structure and includes no exterior case as described in JP 2008-251595 A. That is, the capacitor 10 is a casing-less capacitor. As illustrated in FIG. 3, The capacitor 10 includes the capacitor element 1, the pair of external electrodes 2, and the metal foil 4. The capacitor 10 preferably further includes a capacitor element protecting member 51. The capacitor 10 preferably further includes a pair of bus bars 9. The capacitor 10 preferably further includes electrode sealing members 24. The capacitor 10 preferably further includes a water-repelling layer. The capacitor 10 preferably further includes the heat shrinkage tube 6. Each component will be described below.

<Capacitor Element>

The capacitor element 1 of the present embodiment is basically the same as the capacitor element 1 of the first embodiment. Also in the present embodiment, the capacitor element 1 may be the wound capacitor element 7 (see FIG. 7B) or may be the stacked capacitor element 8 (see FIG. 8D). However, in the present embodiment, the bus bars 9 are connected to the respective external electrodes 2 of the capacitor element 1. As illustrated in FIGS. 3 to 4B, the capacitor 10 according to the present embodiment adopts the wound capacitor element 7 as the capacitor element 1.

<External Electrode>

The external electrodes 2 of the present embodiment are basically the same as the external electrodes 2 of the first embodiment. The capacitor 10 according to the present embodiment also includes the pair of external electrodes 2. The pair of external electrodes 2 are a first external electrode 21 and a second external electrode 22.

<Metal Foil>

Next, the metal foil 4 will be described. The metal foil 4 covers at least part of the capacitor element 1. The metal foil 4 preferably covers the entirety of the side surface of the capacitor element 1. The metal foil 4 may be in contact with any of the first external electrode 21 or the second external electrode 22. However, as illustrated in FIG. 3, the metal foil 4 is preferably in contact with neither the first external electrode 21 nor the second external electrode 22. At least part of the surface of the capacitor element 1 is covered with the metal foil 4, and thereby, moisture is easily suppressed from being absorbed by the surface of the capacitor element 1. In the present embodiment, the metal foil 4 covers the capacitor element 1 via the capacitor element protecting member 51 as illustrated in FIG. 3. This keeps the metal foil 4 out of contact with the external electrode 2, thereby suppressing short circuiting.

The material for the metal foil 4 is not particularly limited. The material for the metal foil 4 is at least a material which is less permeable to moisture and gas such as water vapor than the side surface of the capacitor element 1. For example, in the case of adopting the wound capacitor element 7, the surface of the capacitor element 1 is a dielectric film made of polypropylene, polyethylene terephthalate, polyethylene naphthalate, polyphenylene sulfide, polystyrene, or the like. Thus, the metal foil 4 is at least a foil less permeable to moisture and gas such as water vapor than the dielectric film. In contrast, in the case of adopting the stacked capacitor element 8, the surface of the capacitor element 1 is coated with an electrically insulating protection film. Thus, the metal foil 4 is at least a foil less permeable to moisture and gas such as water vapor than the protection film. Examples of the material for the metal foil 4 include copper, aluminum, iron, stainless steel, magnesium, silver, gold, nickel, and platinum. As the metal foil 4, a resin-clad metal foil may be adopted. The resin-clad metal foil is a member including the metal foil 4 and a resin layer provided on one surface of the metal foil 4.

<Capacitor Element Protecting Member>

As illustrated in FIG. 3, the capacitor 10 preferably further includes the capacitor element protecting member 51. The capacitor element protecting member 51 of the present embodiment is basically the same as the capacitor element protecting member 51 of the first embodiment. Covering the capacitor element 1 with the capacitor element protecting member 51 in addition to the metal foil 4 easily suppresses moisture from being absorbed by the surface of the capacitor element 1.

The capacitor element protecting member 51 is preferably provided between the capacitor element 1 and the metal foil 4. In the present embodiment, as illustrated in FIG. 3, the capacitor element protecting member 51 is provided between the capacitor element 1 and the metal foil 4 and covers the entirety of the side surface of the capacitor element 1 and a side surface of each of the pair of external electrodes 2. Thus, providing the capacitor element protecting member 51 between the capacitor element 1 and the metal foil 4 more easily suppresses moisture from being absorbed by the surface of the capacitor element 1.

The capacitor element protecting member 51 preferably electrically insulates the metal foil 4 from the pair of external electrodes 2. As described above, in the present embodiment, the capacitor element protecting member 51 covers the entirety of the side surface of the capacitor element 1 and the side surface of each of the pair of external electrodes 2. Thus, also when the metal foil 4 covering the capacitor element 1 from above the capacitor element protecting member 51 is provided, the metal foil 4 is electrically insulated from the pair of external electrodes 2 by the capacitor element protecting member 51, which can suppress short circuiting.

The capacitor element protecting member 51 preferably covers the interfaces between the capacitor element 1 and each of the pair of external electrodes 2. That is, as illustrated in FIG. 3, the capacitor element protecting member 51 has ends which preferably extend outside beyond the interfaces between the capacitor element 1 and each of the pair of external electrodes 2 and which preferably cover the interfaces between the capacitor element 1 each of the pair of external electrodes 2. The interfaces between the capacitor element 1 and each of the pair of external electrodes 2 may have gaps via which moisture and gas such as water vapor may enter the capacitor element 1. However, as illustrated in FIG. 3, when the interfaces are covered with the capacitor element protecting member 51, the moisture resistance of the capacitor 10 can be further improved.

When the capacitor 10 further includes the capacitor element protecting member 51, and the metal foil 4 is electrically insulated from each of the pair of external electrodes 2 by the capacitor element protecting member 51, the metal foil 4 preferably covers the interfaces between the capacitor element 1 and each of the pair of external electrodes 2. That is, as illustrated in FIG. 3, the metal foil 4 has ends which preferably extend outside beyond the interfaces between the capacitor element 1 and each of the pair of external electrodes 2 and which preferably cover the interfaces between the capacitor element 1 and each of the pair of external electrodes 2 via the capacitor element protecting member 51. the interfaces between the capacitor element 1 and each of the pair of external electrodes 2 may have gaps via which moisture and gas such as water vapor may enter the capacitor element 1. However, when the interfaces are covered with the metal foil 4 via the capacitor element protecting member 51 as illustrated in FIG. 3, the moisture resistance of the capacitor 10 can be further improved.

Note that when the capacitor 10 includes no capacitor element protecting member 51, the metal foil 4 is provided not to be in contact with at least one (preferably both) of the external electrodes 2. This can suppress short circuiting. In this case, for example, only a central part of the side surface of the capacitor element 1 is covered with the metal foil 4 such that the metal foil 4 is not in contact with the pair of external electrodes 2. The width of the metal foil 4 in this case is a width shorter than the distance from the interface between the first external electrode 21 and the capacitor element 1 to the interface between the second external electrode 22 and the capacitor element 1.

When the metal foil 4 directly covers the capacitor element 1, the distance from the interface between the first external electrode 21 and the capacitor element 1 to an end of the metal foil 4 at the side of the first external electrode 21 (the distance in a direction connecting both ends of the capacitor element 1) is preferably greater than or equal to 3 mm, more preferably, greater than or equal to 5 mm. Similarly, the distance from the interface between the second external electrode 22 and the capacitor element 1 to an end of the metal foil 4 at the side of the second external electrode 22 is preferably greater than or equal to 3 mm, more preferably, greater than or equal to 5 mm. In this case, the pair of external electrodes 2 is less likely to come into contact with the metal foil 4, which more easily suppresses short circuiting.

After the capacitor element 1 is covered with the metal foil 4 as described above, the metal foil 4 may be covered with the capacitor element protecting member 51. However, to suppress short circuiting, the capacitor element protecting member 51 preferably electrically insulates the metal foil 4 from the pair of external electrodes 2 as described above, and the metal foil 4 preferably covers the capacitor element 1 via the capacitor element protecting member 51.

As illustrated in FIG. 3, the metal foil 4 is preferably unexposed outside. Providing the heat shrinkage tube 6 as an outermost layer of the capacitor 10 can make the metal foil 4 unexposed outside. In the present embodiment, the capacitor 10 further includes the heat shrinkage tube 6 provided on the metal foil 4 as illustrated in FIG. 3, and therefore, the metal foil 4 is unexposed outside. Thus, the metal foil 4 is made unexposed outside, thereby suppressing the metal foil 4 from being deteriorated due to oxidation and the like. Moreover, it is possible to suppress short circuiting caused due to the metal foil 4 coming into contact with the pair of external electrodes 2.

<Bus Bar>

As illustrated in FIG. 3, the capacitor 10 preferably further includes the pair of bus bars 9. The pair of bus bars 9 are a first bus bar 91 and a second bus bar 92. The pair of bus bars 9 are bonded to the pair of external electrodes 2 on a one-to-one basis, and thereby, the pair of bus bars 9 can be electrically connected to the pair of external electrodes 2. Specifically, the first bus bar 91 is bonded to the first external electrode 21 and can thus be electrically connected to the first external electrode 21. Similarly, the second bus bar 92 is bonded to the second external electrode 22 and can thus be electrically connected to the second external electrode 22. The pair of bus bars 9 are not particularly limited, and examples of the bus bars 9 include plates made of copper, a copper alloy, or the like. A method for bonding the pair of bus bars to the pair of external electrodes 2 on a one-to-one basis is not particularly limited, and examples of the method include a bonding method by solder welding, resistance welding, ultrasonic welding, or the like. Note that to suppress short circuiting, the pair of bus bars 9 are out of contact with the metal foil 4, and the pair of bus bars 9 are electrically insulated from the metal foil 4.

<Electrode Sealing Member>

As illustrated in FIG. 3, the capacitor 10 preferably further includes the electrode sealing members 24. The electrode sealing members 24 cover the pair of external electrodes 2. The electrode sealing members 24 include a first electrode sealing member 241 and a second electrode sealing member 242. The first electrode sealing member 241 seals and covers the first external electrode 21, and the second electrode sealing member 242 seals and covers the second external electrode 22. As described above, covering the pair of external electrodes 2 with the electrode sealing members 24 to avoid direct contact of the external electrodes 2 with external air easily suppresses moisture from being absorbed by the external electrode 2.

The material for the electrode sealing member 24 is not particularly limited. The material for the electrode sealing member 24 is at least a resin material less permeable to moisture and gas such as water vapor than the external electrode 2. For example, a thermosetting resin such as an epoxy resin may be adopted as the material for the electrode sealing member 24. In this case, the bus bars 9 are bonded to the external electrodes 2, and then, the resin material is applied to cover the entirety of the external electrodes 2 and is cured, thereby forming the electrode sealing members 24. The bus bars 9 protrude from the electrode sealing members 24. Connection parts of the bus bars 9 to the external electrodes 2 are covered with the electrode sealing members 24. When the thermosetting resin is adopted as the material for the electrode sealing members 24, the melting point of the thermosetting resin is preferably lower than or equal to 120° C. In this case, it is possible to reduce the influence of heat over the capacitor element 1 when the thermosetting resin is cured. Note that the material for the electrode sealing members 24 may be a thermosetting resin composition. The thermosetting resin composition contains publicly known inorganic filler, a publicly known hardener, a publicly known catalyst, and the like.

<Water-Repelling Layer>

The capacitor 10 preferably further includes a water-repelling layer (not shown in FIG. 3). The water-repelling layer covers the pair of external electrodes 2 and/or the electrode sealing members 24. Covering the external electrodes 2 and other members with the water-repelling layer makes the external electrodes 2 and the other members more likely to repel water, so that moisture is more easily suppressed from being absorbed by the external electrodes 2 and the other members.

The material for the water-repelling layer is not particularly limited. The material for the water-repelling layer is at least a material less permeable to moisture and gas such as water vapor than the external electrode 2. For example, the water-repelling layer may be made of fluorine-based and silicon-based water-repelling agents. In this case, the bus bars 9 are bonded to the external electrodes 2, and then, the water-repelling agent is applied to cover the external electrodes 2 and is dried, thereby forming the water-repelling layer. When the external electrodes 2 are sealed with the electrode sealing members 24, the water-repelling layer may be formed to cover the electrode sealing members 24.

<Heat Shrinkage Tube>

The heat shrinkage tube 6 of the present embodiment is basically the same as the heat shrinkage tube 6 of the first embodiment. In the present embodiment, as illustrated in FIGS. 3 and 4A, the heat shrinkage tube 6 is provided as the outermost layer of the capacitor 10. FIG. 4B shows the capacitor 10 provided without a heat shrinkage tube 6. In the capacitor 10, the metal foil 4 is provided as the outermost layer, and the capacitor element protecting member 51 is provided between the metal foil 4 and the capacitor element 1. Thus, the capacitor 10 does not have to include the heat shrinkage tube 6. Moreover, the capacitor 10 includes no capacitor element protecting member 51, and the heat shrinkage tube 6 may be attached to the metal foil 4.

3. Third Embodiment (1) Schema

In a third embodiment, components similar to those of the first and second embodiments are denoted by the same reference signs as those in the first and second embodiments, and the detailed description thereof may be omitted.

Figure 5:
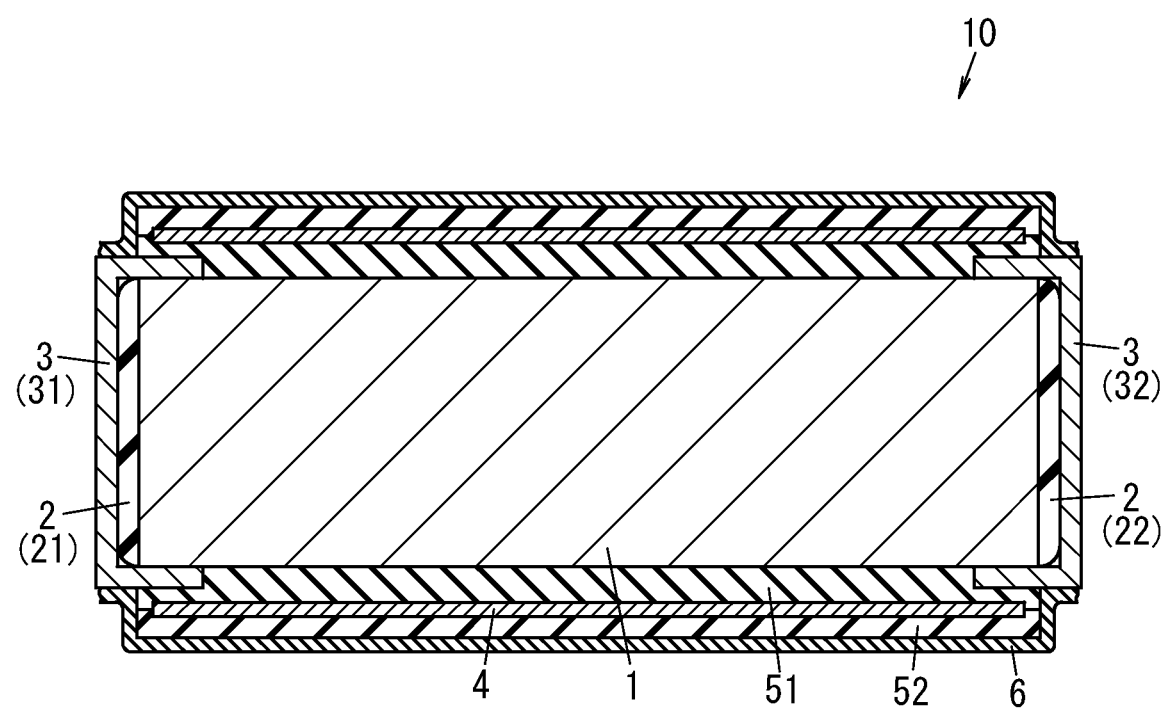
FIG. 5 is a sectional view schematically illustrating a capacitor according to a third embodiment.

As illustrated in FIG. 5, a capacitor 10 according to the present embodiment includes a capacitor element 1, a pair of external electrodes 2, a pair of metal caps 3, and a metal foil 4. The pair of external electrodes 2 are provided at opposite ends of the capacitor element 1. Each of the pair of metal caps 3 covers a corresponding one of the pair of external electrodes 2. The metal foil 4 covers at least part of the capacitor element 1.

The capacitor 10 includes neither an exterior case nor a mold resin filled in the exterior case as described in JP 2008-251595 A. That is, the capacitor 10 adopts a so-called casing-less structure. Thus, the weight of the capacitor 10 can be reduced by at least a weight corresponding to the weight of a conventional exterior case.

As above described, the capacitor 10 includes the pair of metal caps 3 covering the pair of external electrodes 2 on a one-to-one basis. The metal caps 3 have a lower permeability to gas such as water vapor than the external electrodes 2. Thus, covering the external electrodes 2 with the metal caps 3 easily suppresses moisture from being absorbed by the external electrode 2. Moreover, the capacitor 10 includes the metal foil 4 covering at least part of the capacitor element 1. The metal foil 4 is less permeable to gas such as water vapor than the surface of the capacitor element 1. Thus, at least part of the surface of the capacitor element 1 is covered with the metal foil 4, and thereby, moisture is easily suppressed from being absorbed by the surface of the capacitor element 1. The capacitor 10 according to the present embodiment includes both the pair of metal caps 3 and the metal foil 4 as described above and can thus have excellent moisture resistance.

(2) Details

Figure 6A:
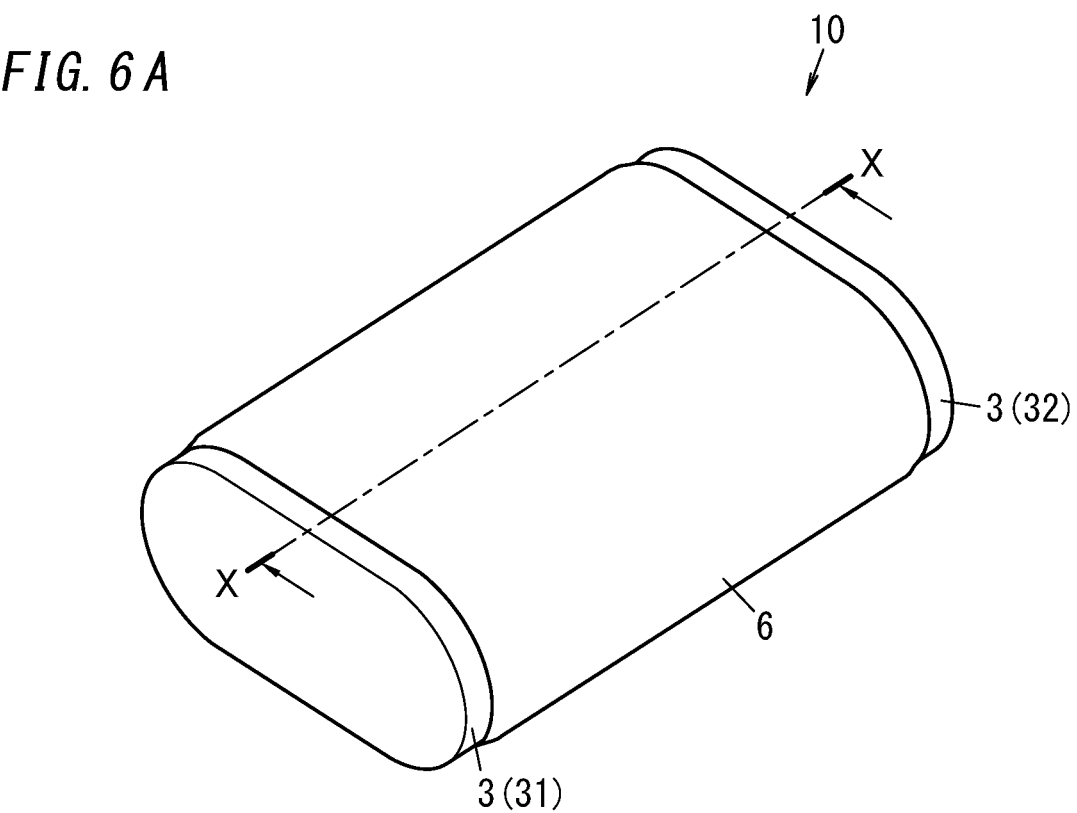
FIG. 6A is a perspective view illustrating the capacitor of the third embodiment, where the capacitor is provided with a heat shrinkage tube.
Figure 6B:
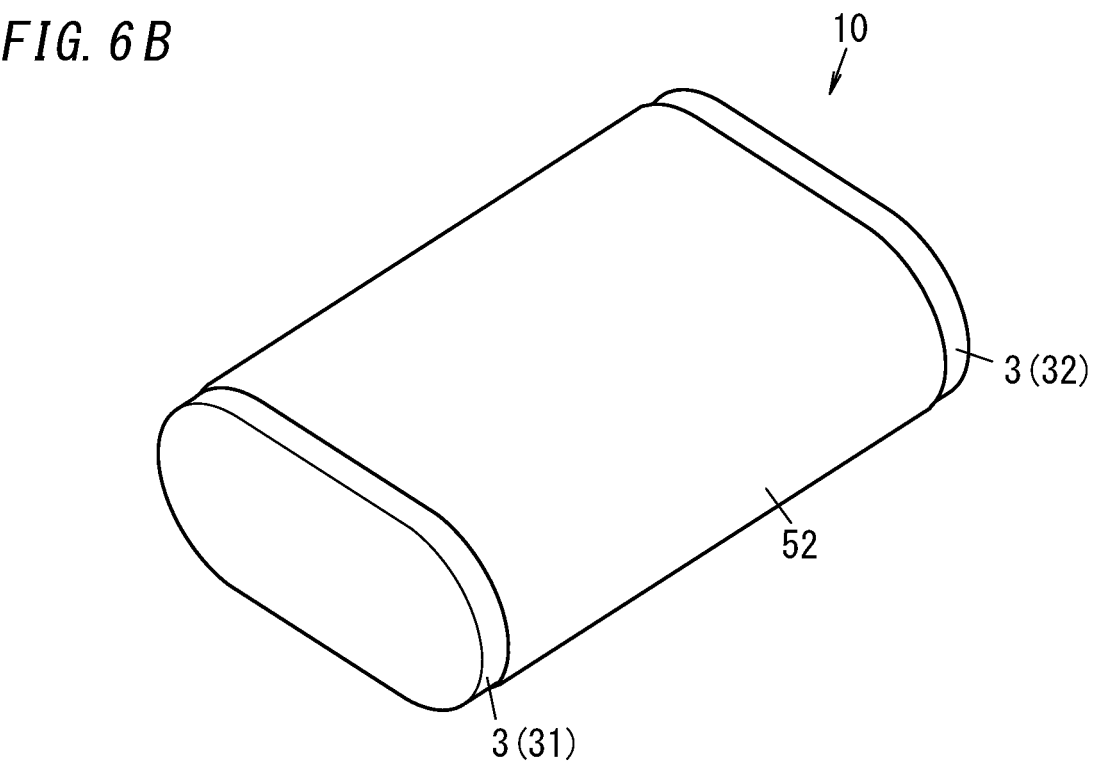
FIG. 6B is a perspective view illustrating the capacitor of the third embodiment, where the capacitor is not provided with the heat shrinkage tube.

The capacitor 10 according to the present embodiment will be described in detail below with reference to FIGS. 5 to 6B. FIG. 6A is a perspective view illustrating the capacitor 10 according to the present embodiment. FIG. 5 is a sectional view along line X-X of FIG. 6A. FIG. 6B is a perspective view illustrating the capacitor 10 provided without a heat shrinkage tube 6.

The capacitor 10 according to the present embodiment adopts a so-called casing-less structure and includes no exterior case as described in JP 2008-251595 A. That is, the capacitor 10 is a casing-less capacitor. As illustrated in FIG. 5, the capacitor 10 includes the capacitor element 1, the pair of external electrodes 2, the pair of metal caps 3, and the metal foil 4. The capacitor 10 preferably further includes a capacitor element protecting member 51. The capacitor 10 preferably further includes a metal foil protection member 52. The capacitor 10 preferably further includes the heat shrinkage tube 6. Each component will be described below.

<Capacitor Element>

The capacitor element 1 of the present embodiment is basically the same as the capacitor element 1 of the first embodiment. Also in the present embodiment, the capacitor element 1 may be the wound capacitor element 7 (see FIG. 7B) or may be the stacked capacitor element 8 (see FIG. 8D). As illustrated in FIGS. 5 to 6B, the capacitor 10 according to the present embodiment adopts the wound capacitor element 7 as the capacitor element 1.

<External Electrode>

The external electrodes 2 of the present embodiment are basically the same as the external electrodes 2 of the first embodiment. The capacitor 10 according to the present embodiment also includes the pair of external electrodes 2. The pair of external electrodes 2 are a first external electrode 21 and a second external electrode 22.

<Metal Cap>

The metal caps 3 of the present embodiment are basically the same as the metal caps 3 of the first embodiment. The capacitor 10 according to the present embodiment also includes the pair of metal caps 3. The pair of metal caps 3 are a first metal cap 31 and a second metal cap 32. The first metal cap 31 covers the first external electrode 21, and the second metal cap 32 covers the second external electrode 22.

As illustrated in FIG. 5, the pair of metal caps 3 covers interfaces between the capacitor element 1 and each of the pair of external electrodes 2. When the interfaces are covered as described above, the moisture resistance of the capacitor 10 can be further improved. A method for attaching the metal caps 3 to the capacitor element 1 is the same as that of the first embodiment.

<Metal Foil>

The metal foil 4 of the present embodiment is basically the same as the metal foil 4 of the second embodiment. The metal foil 4 covers at least part of the capacitor element 1. The metal foil 4 preferably covers the entirety of the side surface of the capacitor element 1. The metal foil 4 may be in contact with any of the first metal cap 31 or the second metal cap 32, but as illustrated in FIG. 5, the metal foil 4 is preferably in contact with neither the first metal cap 31 nor the second metal cap 32. This can suppress short circuiting. Further, the at least part of the surface of the capacitor element 1 is covered with the metal foil 4, and thereby, moisture is easily suppressed from being absorbed by the surface of the capacitor element 1. In the present embodiment, the metal foil 4 covers the capacitor element 1 via the capacitor element protecting member 51 as illustrated in FIG. 5. This keeps the metal foil 4 out of contact with the metal caps 3. This can suppress short circuiting.

<Capacitor Element Protecting Member>

As illustrated in FIG. 5, the capacitor 10 preferably further includes the capacitor element protecting member 51. The capacitor element protecting member 51 of the present embodiment is basically the same as the capacitor element protecting member 51 of the first embodiment. Covering the capacitor element 1 with the capacitor element protecting member 51 in addition to the metal foil 4 easily suppresses moisture from being absorbed by the surface of the capacitor element 1.

The capacitor element protecting member 51 is preferably provided between the capacitor element 1 and the metal foil 4. In the present embodiment, as illustrated in FIG. 5, the capacitor element protecting member 51 is provided between the capacitor element 1 and the metal foil 4 and covers the entirety of the side surface of the capacitor element 1 and part (opening edge) of each metal cap 3. Thus, providing the capacitor element protecting member 51 between the capacitor element 1 and the metal foil 4 more easily suppresses moisture from being absorbed by the surface of the capacitor element 1.

The capacitor element protecting member 51 preferably electrically insulates the metal foil 4 from the pair of metal caps 3. As described above, in the present embodiment, the capacitor element protecting member 51 covers the entirety of the side surface of the capacitor element 1 and the part of each metal cap 3. Thus, also when the metal foil 4 for covering the capacitor element 1 from above the capacitor element protecting member 51 is provided, the metal foil 4 is electrically insulated from the pair of metal caps 3 by the capacitor element protecting member 51, which can suppress short circuiting.

When the capacitor 10 includes the capacitor element protecting member 51, and the metal foil 4 is electrically insulated from each of the pair of metal caps 3 by the capacitor element protecting member 51, the metal foil 4 preferably covers interfaces between the capacitor element 1 and each of the pair of metal caps 3. That is, as illustrated in FIG. 5, the metal foil 4 has ends which preferably extend outside beyond the interfaces between the capacitor element 1 and each of the pair of metal caps 3 and which preferably cover the interfaces between the capacitor element 1 and each of the pair of metal caps 3 via the capacitor element protecting member 51. The interfaces between the capacitor element 1 and each of the pair of metal caps 3 may include gaps via which moisture and gas such as water vapor may enter the capacitor element 1. However, when the interfaces are covered with the metal foil 4 via the capacitor element protecting member 51 as illustrated in FIG. 5, the moisture resistance of the capacitor 10 can be further improved.

Note that when the capacitor 10 includes no capacitor element protecting member 51, the metal foil 4 is provided not to be in contact with at least one (preferably both) of the metal caps 3. This can suppress short circuiting. In this case, for example, only a central part of the side surface of the capacitor element 1 is covered with the metal foil 4 such that the metal foil 4 is out of contact with the pair of metal caps 3. The width of the metal foil 4 in this case is a width shorter than the distance from the interface between the first metal cap 31 and the capacitor element 1 to the interface between the second metal cap 32 and the capacitor element 1.

When the metal foil 4 directly covers the capacitor element 1, the distance from the interface between the first metal cap 31 and the capacitor element 1 to an end of the metal foil 4 at the side of the first metal cap 31 (the distance in a direction connecting both ends of the capacitor element 1) is preferably greater than or equal to 3 mm, more preferably, greater than or equal to 5 mm. Similarly, the distance from the interface between the second metal cap 32 and the capacitor element 1 to an end of the metal foil 4 at the side of the second metal cap 32 is preferably greater than or equal to 3 mm, more preferably, greater than or equal to 5 mm. In this case, the pair of metal caps 3 is less likely to come into contact with the metal foil 4, which more easily suppresses short circuiting.

<Metal Foil Protection Member>

The capacitor 10 preferably further includes the metal foil protection member 52. The metal foil protection member 52 covers at least part of the metal foil 4. As illustrated in FIG. 5, the metal foil protection member 52 preferably covers the entirety of the metal foil 4. In this case, the moisture resistance of the capacitor 10 can particularly be improved.

The material for the metal foil protection member 52 can adopt any material available as a material for the capacitor element protecting member 51. When the capacitor 10 includes both the capacitor element protecting member 51 and the metal foil protection member 52, the capacitor element protecting member 51 and the metal foil protection member 52 may be made of the same material or may be made of different materials.

Similarly to the capacitor element protecting member 51, the metal foil protection member 52 preferably includes at least one selected from the group consisting of an insulating film, a gas barrier film, and a prepreg hardened material. In this case, moisture is more easily suppressed from being absorbed by the surface of the capacitor element 1, so that the moisture resistance of the capacitor 10 can further be improved.

The metal foil 4 is preferably unexposed outside. That is, as illustrated in FIG. 5, the metal foil 4 is preferably disposed between the capacitor element protecting member 51 and the metal foil protection member 52 such that the metal foil 4 is not exposed outside. Thus, the metal foil 4 is made unexposed outside, thereby suppressing the metal foil 4 from being deteriorated due to oxidation and the like. Further, it is possible to prevent the metal foil 4 from coming into contact with the pair of metal caps 3 so as not to form a short circuit.

<Heat Shrinkage Tube>

The heat shrinkage tube 6 of the present embodiment is basically the same as the heat shrinkage tube 6 of the first embodiment.

In the present embodiment, as illustrated in FIGS. 5 and 6A, the heat shrinkage tube 6 is provided as an outermost layer of the capacitor 10. FIG. 6B shows the capacitor 10 provided without a heat shrinkage tube 6. In the capacitor 10, the metal foil protection member 52 is provided as the outermost layer. Thus, the capacitor 10 does not have to include the heat shrinkage tube 6. Moreover, the capacitor 10 does not have to include the metal foil protection member 52. In this case, the metal foil 4 is provided as the outermost layer. Moreover, the capacitor 10 includes no metal foil protection member 52, and the heat shrinkage tube 6 may be attached on the metal foil 4.

In the present embodiment, the pair of metal caps 3 are attached to the pair of external electrodes 2 of the capacitor element 1 on a one-to-one basis, and then, the capacitor element 1 is covered with the capacitor element protecting member 51, but this should not be construed as limiting. For example, the capacitor element 1 may be covered with the capacitor element protecting member 51, and then, the pair of metal caps 3 may be attached. In this case, the metal caps 3 having a size corresponding to the shape of the ends of the capacitor element 1 covered with the capacitor element protecting member 51 may be used. Moreover, when the capacitor element 1 is covered with the capacitor element protecting member 51 at first, the metal foil 4 is covered with the capacitor element protecting member 51 so as not to come into contact with the pair of metal caps 3.

4. Variation

In the first to third embodiments, the wound capacitor element 7 is adopted as the capacitor element 1, but the stacked capacitor element 8 may be adopted.

In the first embodiment, as illustrated in FIG. 1, the entirety of the side surface of the capacitor element 1 is covered with the capacitor element protecting member 51, and then, the metal caps 3 are attached, but this should not be construed as limiting. For example, after the pair of metal caps 3 are attached to cover the pair of external electrodes 2 on a one-to-one basis at respective ends of the capacitor element 1, the entirety of the side surface of the capacitor element 1 may be covered with the capacitor element protecting member 51. In this case, the metal caps 3 each having a shape similar to the shape of the end of the capacitor element 1 provided with the external electrode 2 may be adopted.

As described above, also when the pair of metal caps 3 are attached to the capacitor element 1 at first, and then, the capacitor element 1 is covered with the capacitor element protecting member 51, the capacitor element protecting member 51 preferably covers the interfaces between the capacitor element 1 and each of the pair of external electrodes 2. Also in this case, the metal caps 3 are attached to cover the interfaces at first, and then, the capacitor element protecting member 51 is preferably provided to further cover the interfaces via the metal caps 3.

In the first embodiment, as illustrated in FIGS. 1 to 2B, the capacitor 10 includes no bus bar 9 but may further include bus bars 9. A pair of bus bars 9 may be bonded to the pair of metal caps 3 on a one-to-one basis, thereby electrically connecting the pair of external electrodes 2 to the pair of bus bars 9 on a one-to-one basis.

In the first embodiment, in FIG. 2B, the entirety of the side surface of the capacitor element 1 is covered with the capacitor element protecting member 51, and the pair of metal caps 3 are attached, and then, the edge sealing members 23 seal the interfaces between the capacitor element protecting member 51 and each of the metal caps 3, but this should not be construed as limiting. The pair of metal caps 3 are attached, and the interfaces between the capacitor element 1 and each of the metal caps 3 are sealed with the edge sealing members 23 at first, and then, the entirety of the side surface of the capacitor element 1 may be covered with the capacitor element protecting member 51.

In the second embodiment, in FIG. 3, one capacitor element protecting member 51 covers the entirety of the side surface of the capacitor element 1 and the side surface of each of the pair of external electrodes 2. However, this should not be construed as limiting. Two capacitor element protecting members 51 may be adopted. That is, a first capacitor element protecting member of the capacitor element protecting members 51 may cover a side surface of the first external electrode 21 and part of the side surface of the capacitor element 1 at the side of the first external electrode 21, and a second capacitor element protecting member of the capacitor element protecting member 51 may cover the side surface of the second external electrode 22 and part of the side surface of the capacitor element 1 at the side of the second external electrode 22. Also in this case, the metal foil 4 is electrically insulated from each of the pair of external electrodes 2, and therefore, short circuiting can be suppressed. However, to simplify the manufacturing process of the capacitor 10 and to improve the moisture resistance of the capacitor 10, one capacitor element protecting member 51 preferably covers the entirety of the side surface of the capacitor element 1 and the side surface of each of the pair of external electrodes 2 as illustrated in FIG. 3.

When the capacitor 10 according to the second embodiment includes the capacitor element protecting member 51 as illustrated in FIG. 3, the capacitor 10 may further include the metal foil protection member 52 of the third embodiment. That is, the metal foil 4 may be provided between the capacitor element protecting member 51 and the metal foil protection member 52. In this case, the moisture resistance of the capacitor 10 can particularly be improved. Moreover, the metal foil 4 may be provided between the capacitor element protecting member 51 and the metal foil protection member 52 so as not to be exposed outside, and thereby suppressing the metal foil 4 from being deteriorated due to oxidation and the like.

In the third embodiment, in FIG. 5, one capacitor element protecting member 51 covers the entirety of the side surface of the capacitor element 1 and the side surface of each of the pair of metal caps 3. However, this should not be construed as limiting. Two capacitor element protecting members 51 may be adopted. That is, a first capacitor element protecting member of the capacitor element protecting members 51 may cover a side surface of the first metal cap 31 and part of the side surface of the capacitor 1 at the side of the first metal cap 31, and a second capacitor element protecting member of the capacitor element protecting member 51 may cover a side surface of the second metal cap 32 and part of the side surface of the capacitor 1 at the side of the second metal cap 32. Also in this case, the metal foil 4 is electrically insulated from each of the pair of metal caps 3, and therefore, short circuiting can be suppressed. However, to simplify the manufacturing process of the capacitor 10 and to improve the moisture resistance of the capacitor 10, one capacitor element protecting member 51 preferably covers the entirety of the side surface of the capacitor element 1 and the side surface of each of the pair of metal caps 3 as illustrated in FIG. 5.

In the third embodiment, as illustrated in FIGS. 5 to 6B, the capacitor 10 includes no bus bar 9 but may further include bus bars 9. A pair of bus bars 9 may be bonded to the pair of metal caps 3 on a one-to-one basis, thereby electrically connecting the pair of external electrodes 2 to the pair of bus bars 9 on a one-to-one basis.

5. Aspects

As can be seen from the embodiments and variations described above, the present disclosure includes the following aspects. In the following description, reference signs in parentheses are added only to clarify the correspondence relationship to the embodiments.

A capacitor (10) of a first aspect includes: a capacitor element (1); a pair of external electrodes (2; 21, 22); and a pair of metal caps (3; 31, 32) and/or a metal foil (4). The pair of external electrodes (2; 21, 22) are provided at opposite ends of the capacitor element (1). Each of the pair of metal caps (3; 31, 32) covers a corresponding one of the pair of external electrodes (2; 21, 22). The metal foil (4) covers at least part of the capacitor element (1).

With the first aspect, the capacitor (10) is reduced in weight and has excellent moisture resistance.

A capacitor (10) of a second aspect referring to the first aspect further includes a capacitor element protecting member (51) which is electrically insulating and which covers at least part of the capacitor element (1).

With the second aspect, moisture is easily suppressed from being absorbed via a surface of the capacitor element (1).

In a capacitor (10) of a third aspect referring to the second aspect, the capacitor element protecting member (51) includes at least one selected from the group consisting of an insulating film, a gas barrier film, and a prepreg hardened material.

With the third aspect, moisture is more easily suppressed from being absorbed via a surface of the capacitor element (1).

A capacitor (10) of a fourth aspect referring to the second or third aspect further includes the metal foil (4). The capacitor element protecting member (51) is provided between the capacitor element (1) and the metal foil (4).

With the fourth aspect, moisture is more easily suppressed from being absorbed via a surface of the capacitor element (1), and short circuiting is easily suppressed.

A capacitor (10) of a fifth aspect referring to any one of the first to fourth aspects further includes the pair of metal caps (3; 31, 32). The capacitor (10) further includes edge sealing members (23) which seals opening edges of the pair of metal caps (3; 31, 32).

With the fifth aspect, moisture is easily suppressed from being absorbed via the opening edges of the pair of metal caps (3; 31, 32).

A capacitor (10) of a sixth aspect referring to any one of the first to fifth aspects further includes a water-repelling layer covering the pair of external electrodes (2; 21, 22).

With the sixth aspect, the moisture resistance of the capacitor (10) can further be increased.

A capacitor (10) of a seventh aspect referring to any one of the first to sixth aspects further includes electrode sealing members (8; 81, 82) covering the pair of external electrodes (2; 21, 22).

With the seventh aspect, the moisture resistance of the capacitor (10) can further be increased.

A capacitor (10) of an eighth aspect referring to any one of the first to fourth aspects includes the metal foil (4). The capacitor (10) further includes a metal foil protection member (52) covering at least part of the metal foil (4).

With the eighth aspect, the moisture resistance of the capacitor (10) can further be increased.

In a capacitor (10) of a ninth aspect referring to the eighth aspect, the metal foil protection member (52) includes at least one selected from the group consisting of an insulating film, a gas barrier film, and a prepreg hardened material.

With the ninth aspect, the moisture resistance of the capacitor (10) can further be increased.

A capacitor (10) of a tenth aspect referring to any one of the first to ninth aspects further includes a heat shrinkage tube (6) covering at least part of the capacitor element (1).

With the tenth aspect, the moisture resistance of the capacitor (10) can further be increased.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A capacitor, comprising:
    a capacitor element;
    a pair of external electrodes provided at opposite ends of the capacitor element;
    a pair of metal caps, the pair of metal caps each covering a corresponding one of the pair of external electrodes; and
    a capacitor element protecting member being electrically insulating and covering at least part of the capacitor element,
    the capacitor element protecting member covering interfaces between the capacitor element and each of the pair of external electrodes,
    the pair of metal caps covering the interfaces via the capacitor element protecting member.

2. The capacitor of claim 1, wherein the capacitor element protecting member includes at least one selected from the group consisting of an insulating film, a gas barrier film, and a prepreg hardened material.

3. The capacitor of claim 1, wherein
    the capacitor further includes a metal foil, the metal foil covering at least part of the capacitor element, and
    the capacitor element protecting member is provided between the capacitor element and the metal foil.

4. The capacitor of claim 1, wherein
    the capacitor includes the pair of metal caps, and
    the capacitor further includes an edge sealing member sealing opening edges of the pair of metal caps.

5. The capacitor of claim 1, further comprising a water-repelling layer covering the pair of external electrodes.

6. The capacitor of claim 1, further comprising an electrode sealing member covering the pair of external electrodes.

7. The capacitor of claim 1, wherein
    the capacitor further includes a metal foil, the metal foil covering at least part of the capacitor element, and
    the capacitor further includes a metal foil protection member which is electrically insulating and which covers at least part of the metal foil.

8. The capacitor of claim 7, wherein the metal foil protection member includes at least one selected from the group consisting of an insulating film, a gas barrier film, and a prepreg hardened material.

9. The capacitor of claim 1, further comprising a heat shrinkage tube covering at least part of the capacitor element.

* * * * *